US006773592B2

(12) United States Patent
Bellamy et al.

(10) Patent No.: US 6,773,592 B2
(45) Date of Patent: Aug. 10, 2004

(54) SYSTEMS AND METHODS FOR TREATING WASTE WATER USING AN INOCULUM

(76) Inventors: Kenneth Michael Bellamy, 2 Chablis Ct., Molendinar, Queensland, 4214 (AU); Robert Kingsley Newton, 13 Durnfries Ct., Andergrove, Mackay, Queensland, 4740 (AU)

(*) Notice: Subject to any disclaimer, the term of this patent is extended or adjusted under 35 U.S.C. 154(b) by 0 days.

(21) Appl. No.: 09/895,875

(22) Filed: Jul. 2, 2001

(65) Prior Publication Data

US 2002/0189996 A1 Dec. 19, 2002

(Under 37 CFR 1.47)

Related U.S. Application Data

(63) Continuation-in-part of application No. 09/749,529, filed on Dec. 28, 2000, which is a continuation-in-part of application No. PCT/AU99/00525, filed on Jun. 29, 1999.

(30) Foreign Application Priority Data

Jun. 29, 1998 (AU) .............................................. PP4393

(51) Int. Cl.[7] .............................. C02F 3/30; C02F 3/10; C02F 3/04
(52) U.S. Cl. ...................... 210/601; 210/615; 210/630; 210/920; 435/174
(58) Field of Search .................................. 210/601, 610, 210/611, 615, 616, 617, 620, 621, 622, 630, 916, 920; 435/176, 177, 180, 262.5, 264, 174; 134/8, 22.11

(56) References Cited

U.S. PATENT DOCUMENTS

| | | | |
|---|---|---|---|
| 1,456,914 A | 5/1923 | Coombs ..................... 210/199 |
| 2,043,265 A | * 6/1936 | Roeder ....................... 210/609 |
| 3,715,304 A | 2/1973 | Hefermehl .................. 210/603 |
| 3,994,803 A | 11/1976 | Neff et al. .................. 210/618 |
| 4,427,548 A | 1/1984 | Quick, Jr. ................... 210/617 |
| 4,824,563 A | 4/1989 | Iwahori et al. ........... 210/195.1 |
| 4,826,601 A | 5/1989 | Spratt et al. ............... 210/610 |
| 5,595,893 A | * 1/1997 | Pometto et al. ............. 435/136 |
| 5,733,454 A | 3/1998 | Cummings .................. 210/603 |
| 5,798,044 A | 8/1998 | Strohmeier et al. ......... 210/605 |
| 5,876,990 A | * 3/1999 | Reddy et al. ............... 435/177 |
| 5,906,745 A | 5/1999 | Eto ............................ 210/601 |
| 6,281,002 B1 | * 8/2001 | Moller-Bremer ......... 435/262.5 |
| 6,287,469 B1 | 9/2001 | Ashburn et al. ............ 210/605 |

\* cited by examiner

*Primary Examiner*—Fred Prince

(57) ABSTRACT

A method of treating waste water and particularly sewerage is disclosed. The method involves treating the conduit system making up the sewerage network before it reaches a typical sewerage treatment plant. A key feature of the method involves introducing an inoculum of selected micro-organisms into a quiescent zone in the conduit system. The quiescent zone is where the water is significantly slowed in its passage along the conduit system and may even be temporarily stationary eg, a pumping well or low point in two sections of pipe. Applicant has ascertained that undesirable micro-organisms tend to flourish in these quiescent zones. By introducing the inoculum a competitive culture of favourable micro-organisms is incubated which is able to out compete the undesirable micro-organisms and lead to break down and degradation of the sewerage in the conduit system before it gets to the treatment plant. Further by suppressing the undesirable micro-organisms damage to the conduit system and problems with odorous gases are reduced.

35 Claims, 6 Drawing Sheets

SYSTEMS AND METHODS FOR TREATING WASTE WATER USING AN INOCULUM

RELATED APPLICATION INFORMATION

This application is a Continuation-in part under 35 U.S.C. 120 to U.S. patent application Ser. No. 09/749,529, entitled "Method of Treating Waste Water," filed Dec. 28, 2000, which is incorporated by reference herein in its entirety. This application also is a continuation-in-part of International Patent Application Serial No. PCT/AU99/00525, filed Jun. 29, 1999, and claims priority under 35 U.S.C. 119 to Australian Application No. PP4393 filed Jun. 29, 1998.

FIELD OF INVENTION

This invention relates to a method of treating waste water. The invention has particular application to the treatment of waste water where there is a relatively long period before the waste water is discharged. This invention has particular but not exclusive application to the treatment of sewerage effluent and for illustrative purposes only reference will be made to this application.

PRIOR ART

The conventional method of treating sewerage involves firstly collecting sewerage effluent through a conduit system of sewerage conduits and delivering it to a sewerage treatment plant at or close to the site where the treated effluent will be released. At the conventional sewerage treatment plants, the sewerage effluent undergoes a series of anaerobic and aerobic incubations to remove waste including organic matter, other solids, nitrogen and phosphate and disinfection to reduce the number of pathogenic organisms in the sewerage effluent prior to its release.

As the sewerage effluent passes through the sewerage mains and pumping stations, the sewerage effluent becomes an incubating culture. The composition of the sewerage effluent is continuously changing during its passage. Many of the reactions promoted by the naturally occurring micro-organism populations are undesirable. And produce reaction products such as hydrogen sulphide and ammonia and possibly also other nitrogenous containing compounds such as mercaptans. For example they cause major odour problems in the areas near pumping wells and also produce nasty gaseous chemicals that tend to corrode the conduits and other surfaces in the conduit system.

Further when the sewerage reaches the sewerage plant it has deteriorated in the sense that it contains more complex chemicals and is more difficult to treat than when it entered the system. These chemicals have been generated by the reactions propagated by the naturally occurring micro-organism populations in the conduit system. As a consequence the treatment of the sewerage at the treatment plant involves more unit operations and is more technically difficult than would otherwise be the case.

For example a common problem is the proliferation of filamentous bacteria incubating in a nutrient rich environment. The foaming problem in aerobic tanks results in the need for additional treatment and extends the time for treatment before the treated sewerage effluent can be released. These problems cause the cost of treatment to rise.

In the specification the term "comprising" shall be understood to have a broad meaning similar to the term "including" and will be understood to imply the inclusion of a stated integer or step or group of integers or steps but not the exclusion of any other integer or step of group of integers or steps. This definition also applies to variations on the term "comprising" such as "comprise" and "comprises".

SUMMARY OF THE INVENTION

According to one aspect of this invention there is provided a method of treating waste water passed through a conduit system comprising at least one conduit extending from at least one entry point to a discharge point and including at least one quiescent zone where water is at least temporarily slowed in its displacement towards the discharge point, the method including introducing an inoculum into the system at at least one primary inoculation site for facilitating its entry into the quiescent zone where it incubates and forms an inoculum culture that influences the type and quantity of certain micro-organism populations in the system both within the quiescent zone and downstream thereof, the inoculum culture encouraging micro-organisms that assist with the break down or degradation of organic compounds within the waste water and retarding micro-organisms that tend to form undesirable compounds from the organic compounds in the waste water Applicant has noted that sustained high velocity water flow significantly retards production of negative effects in waste water streams. Conversely, applicant has noted that unfavourable organisms tend to flourish in these quiescent zones where they attach to the surfaces of the conduit and the like. The organisms attach to both submerged surfaces in contact with the water and exposed surfaces in contact with the gas or air space above the surface of the water. This incubation of cultures of the harmful micro-organisms in the quiescent zones occurs because of the fact that the water does not have a significant path length or longitudinal velocity in these zones. The cultures produce chemical compounds that release toxic gases, eg hydrogen sulphide, and compounds that attack the materials of the conduit, eg concrete.

Applicant has discovered that these same quiescent zones can be used to produce positive reactions in the waste water (i.e. partial break-down) by a careful process of introduction of beneficial organisms (i.e. those which work to effect break-down of organic matter in the waste stream without large scale production of negative substances or effects) to the system by incubating an inoculum. This allows organisms which would not otherwise flourish (or would otherwise be out-competed) to maintain viable populations. Put another way the micro-organism population can be altered to produce catabolic-type reaction products rather than more complex anabolic reaction products.

Thus an inoculum is introduced to a quiescent zone where it encourages the propagation of beneficial organisms and suppresses the growth of harmful organisms, ie that react with the waste compounds to produce undesirable compounds such as ammonia and hydrogen sulphide.

In this specification the term quiescent zone means a zone somewhere along the length of the pipe where the water flow is interrupted or at least significantly reduced. The typical flow through the conduit resembles plug flow where all water is travelling at the same speed through the conduit towards the discharge point. However in the quiescent zone the water does not significantly advance towards the discharge point although there may be internal mixing in the zone. A quiescent zone may for example be formed by a pumping well, a low point at the interconnection of two conduit sections or any other zone where part of the pipe is exposed and water vapour collects. A quiescent zone may also occur intermittently in a given conduit in relation to intermittent cycles of a pump or variations in volumes of flow through the conduit.

The culture incubated by the inoculum typically comprises both aerobic and anaerobic micro-organisms and the micro-organisms in the inoculum culture typically exist in a symbiotic relationship with each other. Thus when the micro-organisms in the inoculum culture are carried by the water into an anaerobic environment a viable population of aerobic organisms will remain and when the micro-organisms incubated by the inoculum culture are carried in the water into an aerobic environment a viable population of anaerobic micro-organisms will remain.

Applicant has noted that the cultures of undesirable micro-organisms which produce negative effects in waste water systems (e.g. odour, aggressive atmospheres) are largely located on the surfaces of the conduits in the quiescent zones as distinct from in the waste water itself. Accordingly it is the cultures on the surfaces of the quiescent zones which have to be addressed. Prior methods have assumed that cultures causing negative effects are resident primarily in the water as distinct from on the surfaces which is incorrect.

Typically the system includes at least one surface, typically a plurality of surfaces, in the quiescent zone and the miro-organisms formed by the inoculum adhere tenaciously to the surface/s of the system.

The surfaces may be formed by the conduits and the micro-organisms formed by the inoculum preferably have the ability to adhere at least as tenaciously to the surface/s as the harmful microorganisms in the system.

The introduction and nurturing of these beneficial organisms at specific sites and the resultant positive effects (and suppression of negative effects) is the basis of this invention.

The inoculum culture may be introduced into the quiescent zone either directly or indirectly. By indirect introduction is meant putting the culture into the conduit/s either upstream or downstream of the quiescent zone and letting the fluid flow in the system, ie gas or liquid, carry it to the zone. More specifically the inoculum culture may be introduced indirectly into the quiescent zone by being introduced into the water upstream of the quiescent zone and allowing it to flow with the water to the quiescent zone. Alternatively the inoculum culture may be introduced into an air space in the conduit as fine droplets either upstream or downstream of the quiescent zone, and be carried by the air upstream to the quiescent zone.

The inoculum may include photosynthetic micro-organisms, heterotrophic bacteria, and lactic acid bacteria and the inoculum may further include a substrate.

The inoculum of selected microorganisms is preferably a mixed population the proportions of which may vary depending on the type of waste introduced into the waste water reticulation system. Further, the type of microorganisms selected may vary depending on the type of waste introduced into the waste water reticulation system. For example, where the waste introduced into the waste water reticulation system has a high proportion of fat or oil, lactic acid bacteria may be selected and an inoculum may contain a high proportion of lactic acid bacteria compared with other microorganisms. In creating the conditions where an inoculum contains a high proportion of lactic acid bacteria a relatively large amount of sugar may be added during preparation of the inoculum to serve as a substrate for lacto-bacillus and other fermentative organisms which as a consequence forms a combination of lactic and acetic acids that assists in degrading the fat and oil substrates. The selected microorganisms are chosen because of their ability to co-operate in reducing the waste to small molecular weight products, including water and $CO_2$. The microorganisms are preferably chosen based on their ability to breakdown each other's products.

The inoculum may include purple non-sulphur producing heterotrophic photosynthetic bacteria, lactobacillus, yeasts, actinomycetes, Nocardia species, ray fungi, plankton and other chemoautotrophic bacteria. In a preferred form the inoculum is produced from the EM (Effective Microorganisms) formulation which is commercially available.

Often the conduit system has a plurality of conduits and specifically a plurality of conduits in parallel. The method may include introducing inoculum into a plurality of primary inoculation sites located in parallel conduits.

This enables a widespread conduit network, with many branches towards the upstream end thereof, to be treated in a way that has an effect throughout the system. The inoculum is introduced to a quiescent zone in each of the conduits.

Preferably each primary inoculation site is positioned such that at least 50% of the water passing through the primary inoculation site has spent less than 25% of its total residence time in the system when it passes through the inoculation site.

Very often the conduit systems are long and contain a plurality of quiescent zones along their length and it is desirable to introduce further inoculum downstream of the primary inoculation site. This replenishes the culture of beneficial micro-organisms and perpetuates or maintains the favourable environment produced by the inoculum further downstream in the conduit system.

The conduit systems may include at least one secondary inoculation site positioned downstream of the primary inoculation site/s, each secondary inoculation site introducing inoculum to a yet further quiescent zone and positioned such that at least 50% of the water passing through the site has spent 50 to 75% of its residence time in the system.

Preferably the system also includes at least one further inoculation site called a tertiary inoculation site downstream of the secondary inoculation site. The purpose of the tertiary inoculation site is the same as the secondary inoculation site namely to bolster and maintain the culture of beneficial micro organisms at an appropriate level in a downstream quiescent zone through which the water passes before it reaches the discharge point.

Typically there is only one tertiary inoculation site and substantially all of the water flows through the site. Preferably the tertiary site is positioned such that the water passing therethrough has spent 50 to 80% of its residence time in the conduit system. Further preferably the tertiary inoculation site is positioned so that the inoculum introduced at the site is incubated in a quiescent zone, eg a pumping well prior to the rising main or a quiescent zone in the rising main. A tertiary site inoculation is preferred where more than 750 kiloliters per day of effluent or waste is collected for transfer by rising main of more than one thousand meters in length.

The secondary and tertiary inoculation sites serve to boost the population of the selected microorganisms. As indicated above, the waste water effluent in a waste water reticulation system is dynamic and undergoes constant change depending on the conditions that prevail at different stages in the waste water reticulation system. As a result of incubation at any one particular zone, the population of some of the selected microorganisms will increase whereas the population of other selected microorganisms will decrease. It is therefore preferred that the waste water effluent is subjected to further inoculation as it travels through the waste water reticulation system. By inoculating the waste water effluent again the population of the desired selected microorganisms can be increased and thus continue to degrade the waste in the waste water effluent. The subsequent inoculation can effectively augment deficiencies in the culture of the previously inoculated waste water effluent. In this way, a blanket effect is achieved which covers substantially all of the incubating cultures affecting the waste water effluent and found in quiescent zones throughout the system.

Generally the amount of inoculum introduced into the conduit system per unit time may be a function of the surface area of the interior surface of the conduit system and the volume or size and number of quiescent zones through which the effluent passes and not necessarily related to the volume of water flowing through the system.

The difference between dosage rates of inoculum at the various primary inoculation sites may be less than 20%, preferably less than 5%. More preferably the dosage rates are substantially the same across a majority of the sites. However often a system will have one or more sites having higher dosage rates. This is due to the fact that the positioning of the sites has to fit in with the existing characteristics of the conduit system. Usually the sites having higher dosage rates are secondary and tertiary sites although they may also include primary sites.

The method may further include providing at least two secondary inoculation sites positioned downstream of the primary inoculation site/s, and having the difference between dosage rates of inoculum at the secondary inoculation sites being less than 20%, preferably less than 5%. More preferably the dosage rates are substantially the same across all the secondary sites.

Where the conduit has at least one tertiary site, the difference between dosage rate of inoculum between the tertiary site and the secondary sites may be less than 20%.

Each of the primary and secondary inoculation sites may have a difference in dosage rate of not more than 5%.

In this invention the conduit system is used to effectively treat the sewerage effluent before it reaches the discharge point. The invention uses rising mains, gravity mains and various pumping wells as quiescent zones to incubate specific cultures of microorganisms. The inoculation with selected microorganisms results in competition for available nutrients and thus alters the type and number of microorganisms and the type and quantity of fermentation products produced in the sewerage effluent.

According to another aspect of this invention there is provided a method of treating waste water passed through a conduit system comprising at least one conduit extending from at least one entry point to a discharge point the method including introducing an inoculum into the system at at least two inoculation sites longitudinally spaced apart from each other along the conduit system, the sites being used to introduce inoculum to the conduit system where it incubates and forms an inoculum culture that influences the type and quantity of certain microorganism populations in the system both proximate to the inoculation site and downstream thereof, the inoculum culture encouraging micro-organisms that assist with the break down or degradation of organic compounds within the system and retarding micro-organisms that tend to form undesirable compounds from the organic compounds in the system.

Advantageously the location of the spaced sites is chosen such that the negative substrates produced by normally occurring populations of micro-organisms incubated within the conduit system are relatively stable downstream of the site and the substrates produced by populations of the micro-organisms established at a said site would not vary dramatically, that is by more than 20% between the inoculation site and a point downstream of the site. This point may be proximate or it may be remote. This indicates a resistance to uncontrolled swings in populations of undesirable micro-organisms (blooms). This stability is very important to any program aimed at treating the water.

The spacing of the inoculation sites may be chosen such that the substrates produced by populations of micro-organisms fostered by the inoculum culture are relatively stable and would not vary by more than 20% at any points along the conduit path between longitudinally spaced inoculation sites. The downstream sites are chosen to suitably boost the population of favourable microorganisms at the appropriate point along the conduit system and are positioned so as to do this before any major changes in substrates and populations occur.

Preferably the dosage rate of inoculum at each of the inoculation sites is substantially the same and the inoculum is delivered regularly and evenly over a unit time period.

The system may have either two or three said inoculation sites longitudinally spaced apart from each other, preferably three.

Inoculation at an inoculation site preferably occurs by inoculation means which may include spraying of inoculum from a nozzle or passing waste water over a support medium seeded with selected microorganisms. Inoculation sites may be associated with sewerage mains, pump wells, silt collection traps and transfer stations. In addition, the surface area in the collection and transfer network provides potential sites for support mediums of inoculating microorganisms.

The inoculation means may include an inoculation chamber which is positioned between two mains and serves as a site to inoculate waste water effluent. The inoculation chamber may be positioned in a pump well or inline between conduits.

The inoculation means employed at a particular site will depend on the conditions at the site. For example, where the level of anaerobic activity will be high because of long rising mains or long retention time due to slow flow, aerosol inoculation is preferred as it allows proliferation of augmented aerobic and heterotrophic organisms to help maintain a balance of aerobic and anaerobic activity and this is particularly relevant where the inoculum contains organisms which allow an increased level of dissolved oxygen to appear in the effluent during anaerobic activity. In another example where there are long gravity mains and there will be relatively high aerobic activity, a support medium of seeded selected microorganisms are positioned so that effluent passing over is inoculated with the microorganisms. This allows proliferation of augmented anaerobic organisms in the effluent to help maintain a balance of aerobic and anaerobic activity allowing some increased anaerobic activity in a largely aerobic environment.

The inoculum of selected microorganisms may be prepared by a batch process or alternatively a continuous process.

The incubated inoculated effluent in the inoculation chambers allows the selected microorganisms to adapt to and reproduce in the effluent and in the quiescent zones associated with the effluent as a partially prepared medium source. This reduces the environmental shock load on the selected microorganisms when they are released to the reticulation system. In a pump well inoculation chamber the subsequent culture may incubate until a sensor signals for the release of the culture into the mains. In an in-line inoculation chamber the subsequent culture constantly incubates in the system and the flow of water releases the culture. The incubating culture in the inoculating chamber serves to inoculate further untreated effluent.

The inoculation means may include an inoculum reservoir having a housing, an inoculum source contained within the housing and means for dispensing the inoculum at a particular site. The inoculum may be in a concentrated form and be diluted prior to being dispensed. Other additives may be dispensed with the inoculum. Other additives may include acetic acid, citric acid, or sugar solutions.

In another aspect, the invention broadly resides in an inoculation chamber including a housing with a waste water inlet and a waste water outlet; and a support medium means seeded with selected microorganisms wherein the waste water substantially passes over and through the support medium and is inoculated with micro-organisms released therefrom.

The support medium means preferably includes a base layer of sand or crushed rock such as crushed blue metal but preferably zeolite. The support medium preferably includes a second layer of porous clay or concrete bricks. Alternatively the second layer may include crushed rock such as blue metal that has a larger diameter than the material used for the first layer. The support medium means preferably includes a third layer of similar material as used in the first layer such as zeolite. The support medium means preferably includes a fourth upper layer of biologically activated ceramic. The biologically activated ceramic preferably includes selected microorganisms contained therein. The biologically activated ceramic preferably is arranged so that the waste water effluent becomes mixed, aerated with turbulence and inoculated with microorganisms therefrom.

The inoculation chamber may also include a spray means for providing a spray inoculum to the waste water flowing into the chamber and to surfaces of the inoculation chamber, including the support medium.

BRIEF DESCRIPTION OF THE DRAWINGS

In order that this invention may be more readily understood and put into practical effect, reference will now be made to the accompanying drawings which illustrate a preferred embodiment of the invention. In the drawings.

DETAILED DESCRIPTION OF THE PREFERRED EMBODIMENTS

Figure 1:
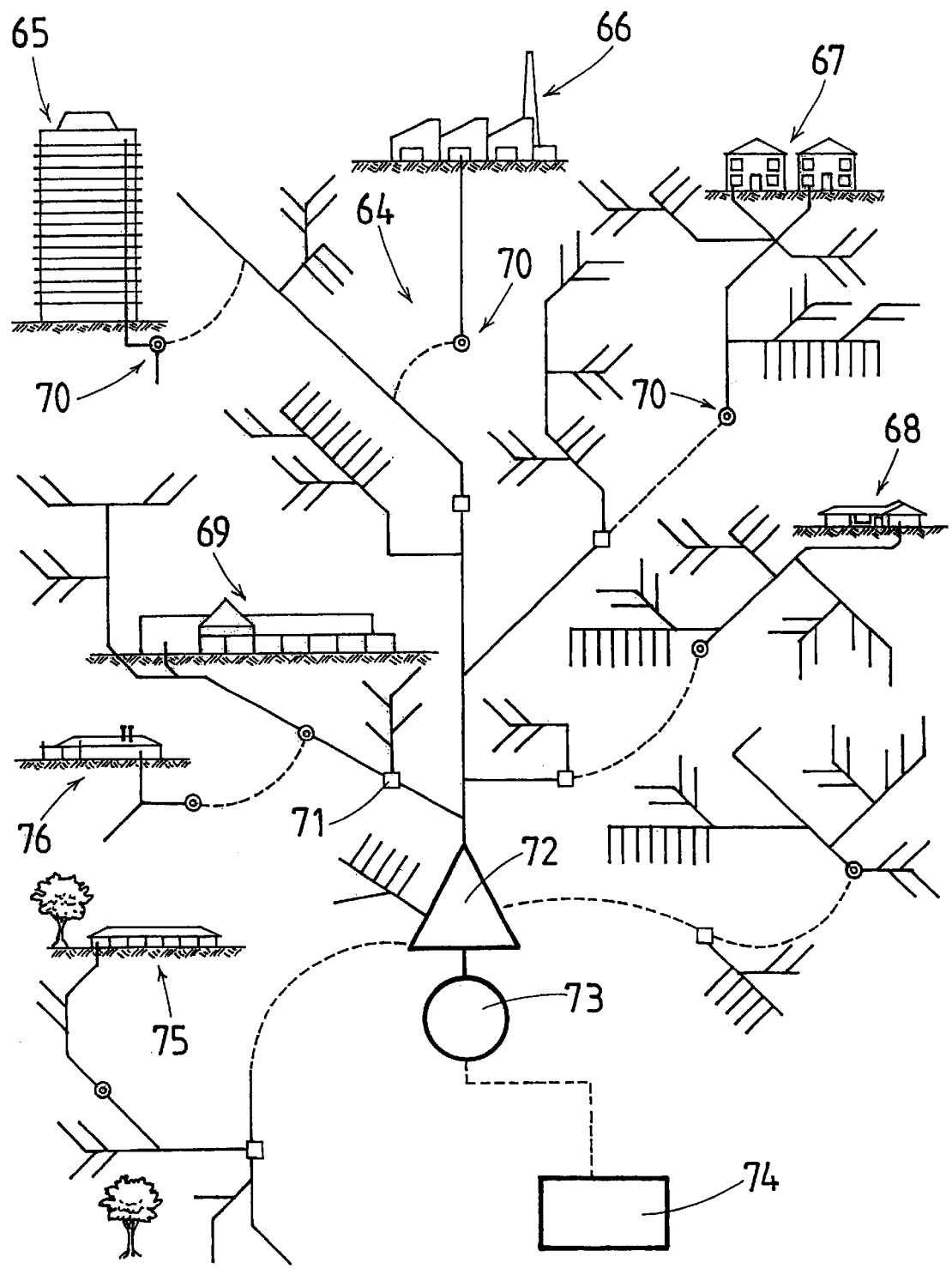
FIG. 1 is a diagrammatic view of the inoculation sites of the current invention in different residential, commercial and industrial locations.

With reference to FIG. 1 there is shown a conduit system comprising a plurality of conduits extending from a plurality of entry points to a discharge point. The system has a number of primary inoculation sites, secondary inoculation sites and a tertiary inoculation site relative to various residential locations, commercial locations and industrial locations.

A quiescent zone in the conduit system is associated with each inoculation site. A quiescent zone is a zone where the water flow is interrupted or at least significantly reduced. The typical flow through the conduit resembles plug flow where all water is travelling at the same speed through the conduit towards the discharge point. However in the quiescent zone the water does not significantly advance towards the discharge point although there may be internal mixing in the zone. A quiescent zone may for example be formed by a pumping well, a low point at the interconnection of two conduit sections or any other zone where part of the pipe is exposed and water vapour collects. The inoculation site is the entry point into the system and in particular the quiescent zone.

Figure 2:
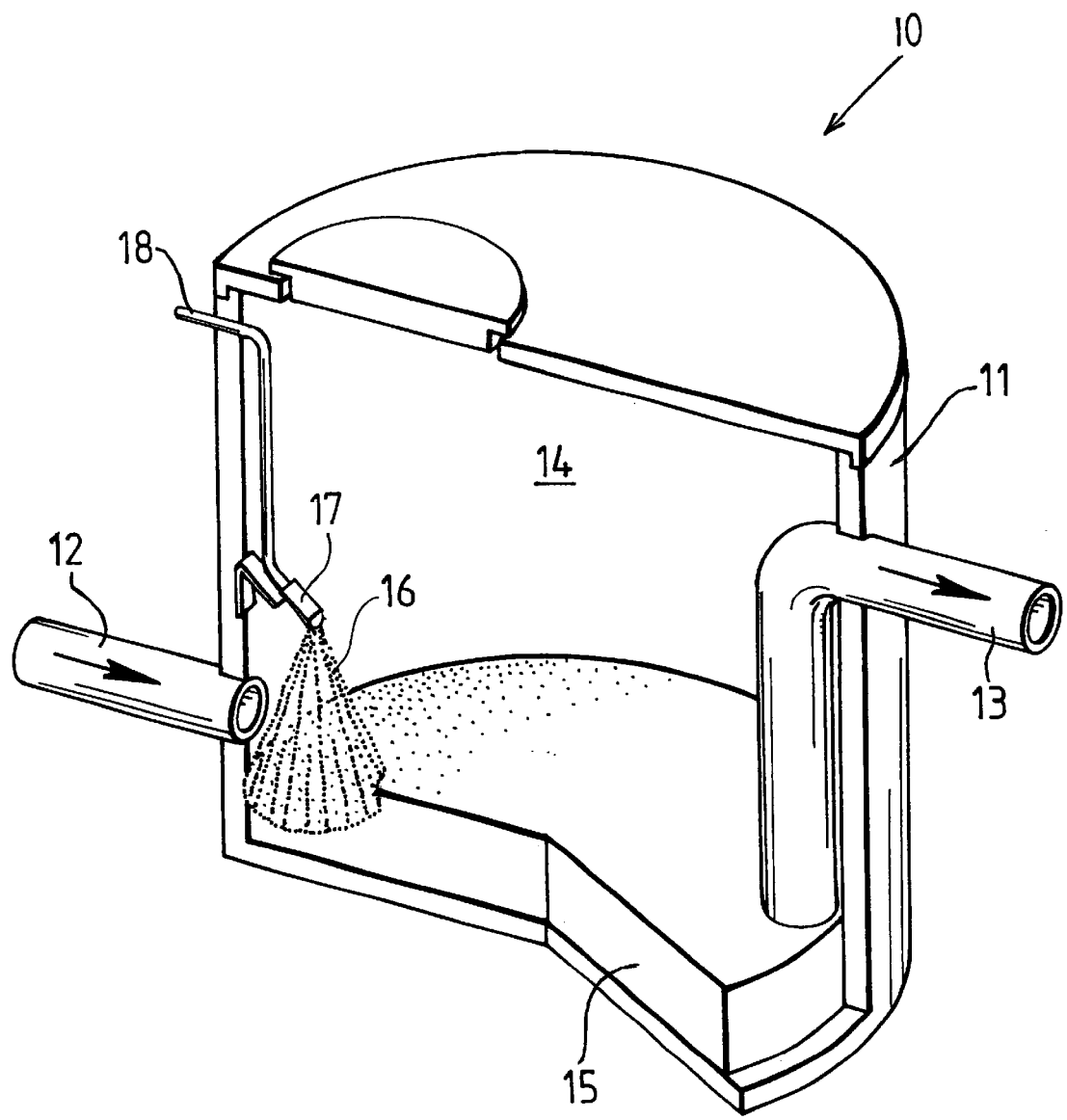
FIG. 2 is an inoculation site of the current invention at a mains pump well.

With reference to FIG. 2, there is shown a conventional pump well 10 having a housing 11, a waste water effluent inlet 12 and a waste water effluent outlet 13. The waste water effluent enters through the inlet 12 into the internal region 14 of the pump well 10. The waste water effluent 15 shown in the pump well 10 rises to a point where a sensor (not shown) actuates a signal for the pump (not shown) to start and pump the effluent 15 out of the chamber 10 through the outlet 13. The method of the current invention treats waste water effluent by introducing an inoculum of selected microorganisms 16 into the well or chamber 10 and some of which is carried by the waste water passing through the well or chamber. The inoculum 16 is introduced by a spray nozzle 17 connected to a dosing line 18. The dosing line 18 is subsequently connected to an inoculum reservoir With reference to FIG. 3, there is shown an inoculation chamber 20 having a housing 21, an inlet 22, and an outlet 23. The inoculation chamber 20 includes a support medium 31 that consists of four layers. The base or first layer 24 consists of crushed zeolite. A second layer 25 consists of porous, clay or concrete perforated bricks. These bricks may also be stacked on top of each other to increase the depth of the layer 25. The third layer 26 consists of crushed zeolite and provides a flat surface for the fourth layer 27. The fourth layer 27 consists of biologically activated ceramic 28 mounted on polyethylene rods 29. The polyethylene rods 29 are connected together by a elongate shaft 30 which serves as a backbone holding the rods 29 relative to each other. The shaft 30 is made of stainless steel. The flow of the waste water effluent entering the inoculation chamber 20 from the inlet 22 becomes turbulent because of the position of the biologically activated ceramic 28 lying transversely across the direction of flow. The turbulence mixes the waste water effluent, aerates the waste water effluent, and inoculates the waste water effluent with microorganisms from the biologically activated ceramic 28 as it passes over and through the support medium. The inoculation chamber also includes a spray nozzle 33 connected to a dosing line 34 which in turn is connected to an inoculum reservoir. The spray nozzle 33 sprays the chamber 10 with inoculum of selected microorganisms.

Figure 4A:
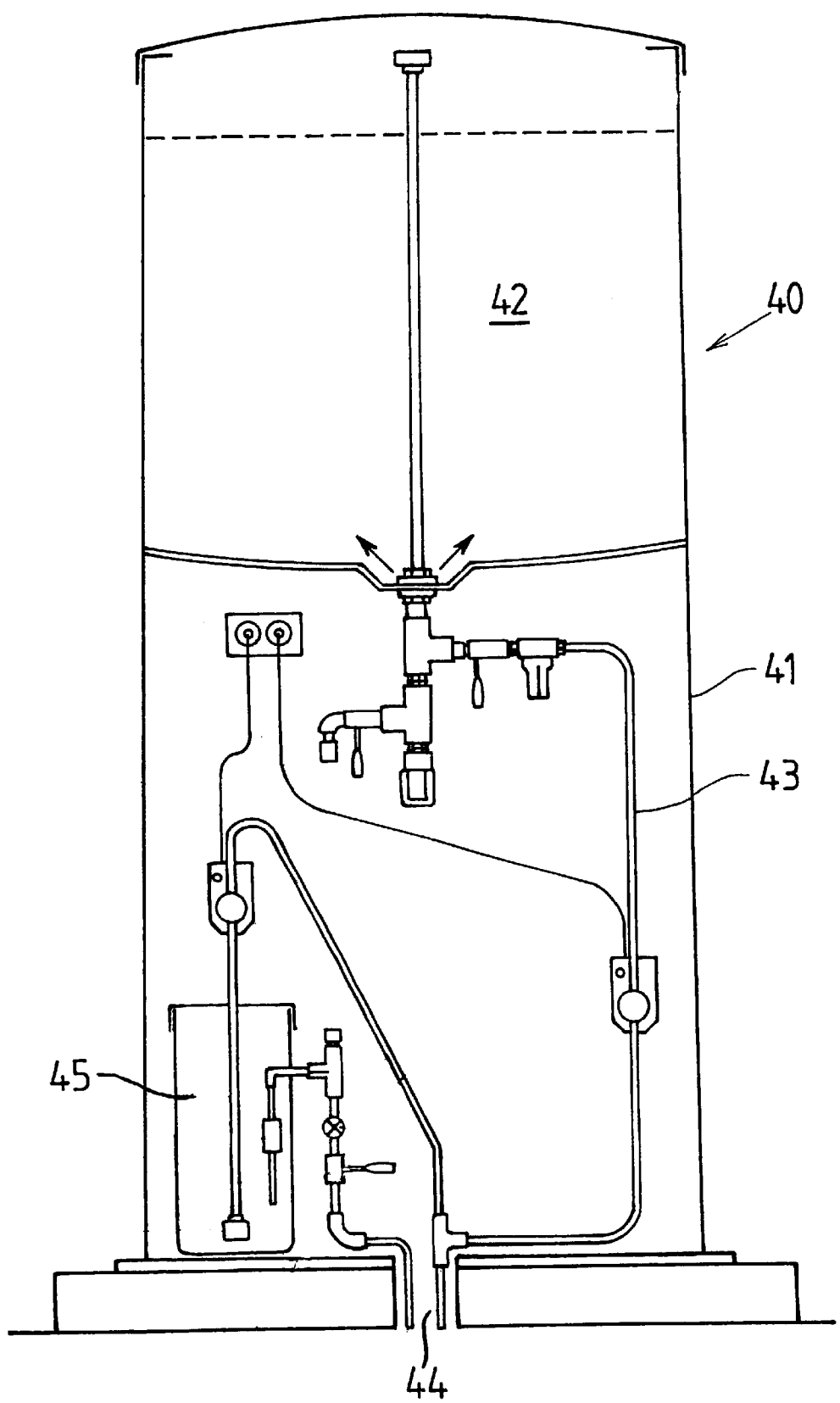
FIG. 4 is a diagrammatic view of an inoculum reservoir of the current invention.
Figure 4B:
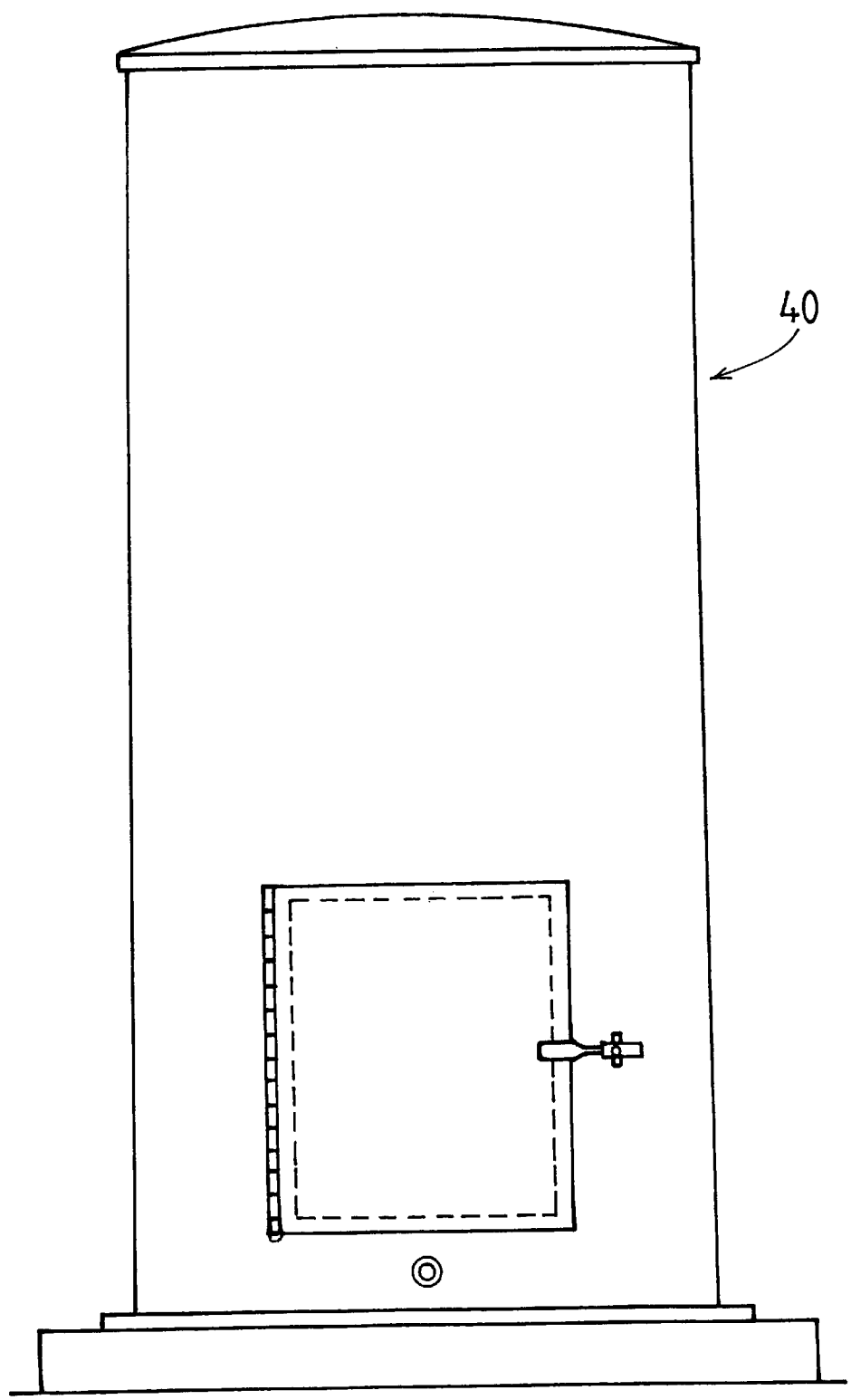
Figure 4C:
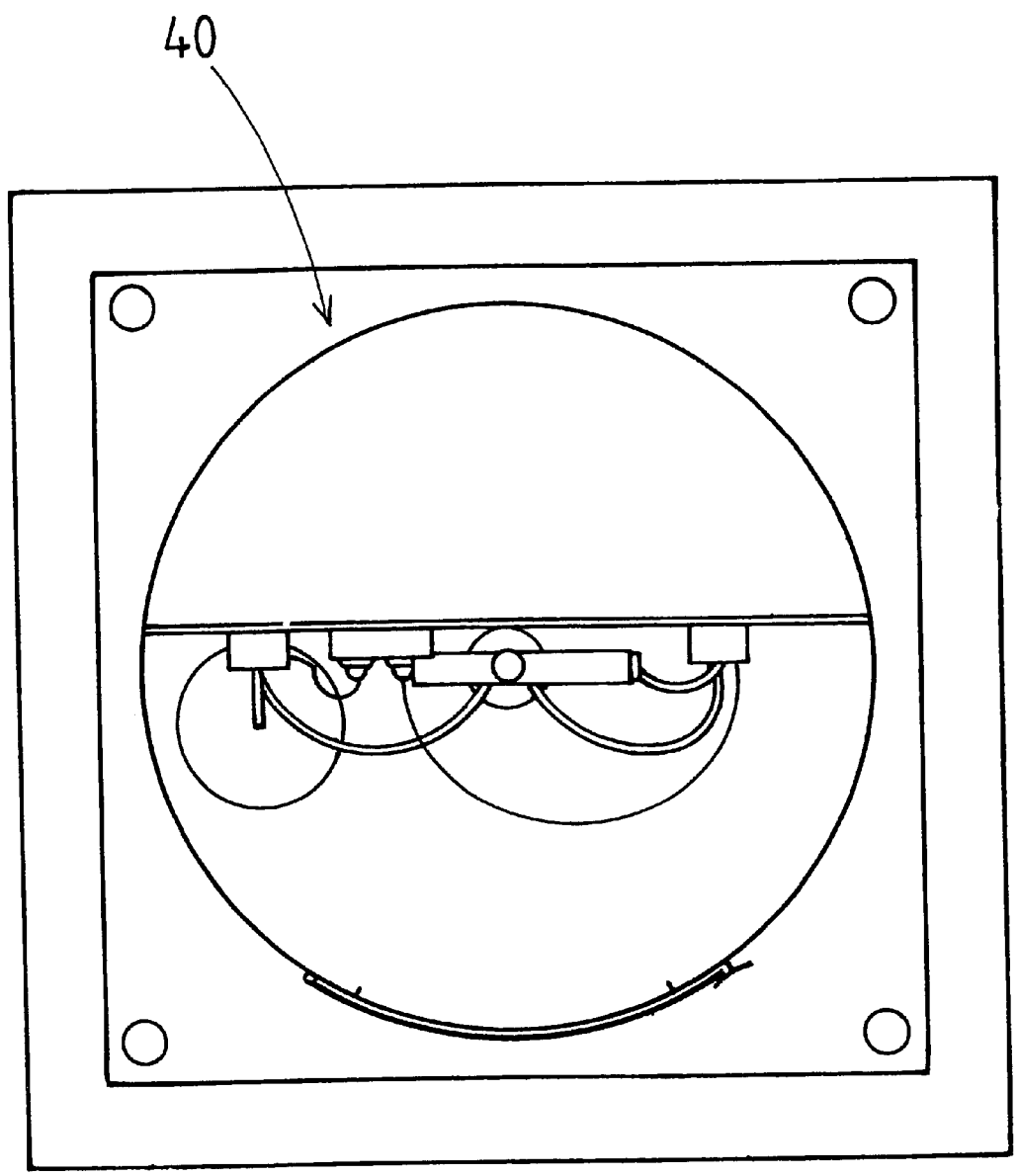

With reference to FIG. 4, there is shown an inoculum reservoir 40 having a housing 41, inoculum source 42, and supply lines 43 for providing an inoculum to the dosing line 44. The inoculum reservoir 40 also contains a water source 45 for diluting the inoculum as it is provided to the dosing line 44. Other additives may be added to the inoculum at the dosing line 44. These additives may include acetic acid, citric acid and sugar solutions. The inoculum source 42 is preferably a batch culture maintained at or near an exponential phase with the provision of nutrient substrate. Preferably there is provided a floating baffle which assists in maintaining anaerobic bacteria. The water source may be refilled with potable water from the released treated effluent and may return some beneficial microorganisms. The water source and upper inoculum holding tank may contain at least one kg of biologically activated ceramic media which helps to incubate organisms which perform an antioxidant function.

Figure 3A:
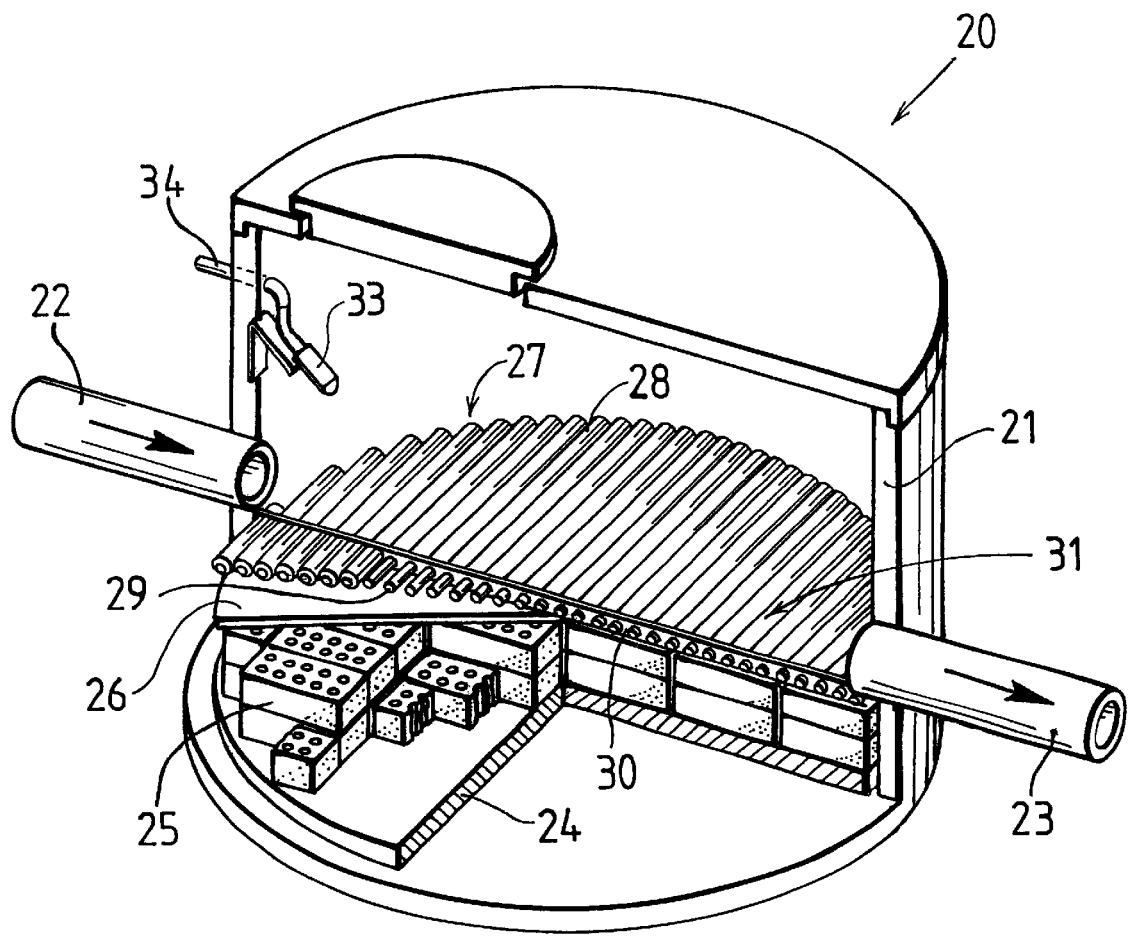
FIG. 3 is a diagrammatic view of inoculation chamber of the current invention.
Figure 3B:
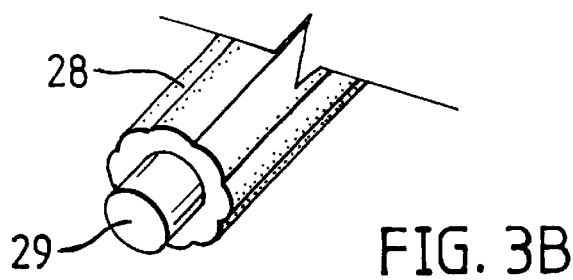

The preferred embodiment of the method of treating waste water in a waste water reticulation system includes inoculating substantially all the waste water effluent at least once, approximately 75% of the waste water effluent is inoculated twice, and approximately 50% of effluent is inoculated three times. Collection/retention/incubation areas are available in line such that 50% of all effluent passes through one such area within the first quarter of its residence time in the system en route to the Treatment Plant. This may entail ensuring that dosed pump wells allow constant retention of approximately 750 mm of fluid by adjusting float sensors or, where gravity collection predominates, provision of the innoculation chambers. Preferably one inoculation/pump well inoculation chamber is present for each 125000 L/Day [7.5% for smaller systems] of expected normal effluent flow. Approximately 20% of the inoculation chambers would preferably be in-line inoculation chambers as shown in FIG. 3. In a preferred embodiment, treated effluent is recycled to a primary inoculation site or sites to maintain a flow of effluent through the site for at least 8 hours a day.

These inoculation sites should be divided into three categories: Primary sites, Secondary (booster) sites, and Tertiary (booster) sites.

Primary inoculation sites are chosen at the earliest possible collection point (either existing or installed) where flow is constant for at least eight (8) hours per day. In practical terms, this generally equates to the earliest Pumping Station or a nominated inoculation chamber site in a collection system which will generally process a maximum of 75000 L/day of effluent [or ten per cent (10%) for smaller systems of the total system effluent flow].

Secondary (booster) inoculation sites are chosen to cover confluence of effluent such that one site exists for each two hundred thousand liters per day (200,000 L/day) [or twenty per cent (20%) of the total effluent flow in the system for smaller systems].

Tertiary (booster) inoculation sites are installed at each Main Pumping Station, that is those which pump directly to a Treatment Works or a major collection point in the system, and collects seven hundred and fifty thousand liters to one megaliter per day of effluent.

Where there is a rising main following of 0.25 km or more there is preferably an inoculation site. Any trouble spot locations are considered for further inoculation sites or to coincide with choice of primary or secondary inoculation sites as above. Trouble spots include areas where there is a high fat concentration in the effluent or areas where there is unusually long retention times.

Overall inoculation sites are selected such that there is on average one inoculation site for each 125000 Liters of effluent flow per day provided that in each case at least a primary and secondary inoculation as set out above is achieved and that systems which have a main collection point with either rising main or gravity transfer main following of 1.0 km or more also have a tertiary inoculation site or sites prior to such transfers.

Typically selection of inoculation sites according to this formula will mean that for a collection system which transfers one megaliter per day will have 13 inoculation sites of which, 8 will be primary inoculation sites, 4 will be secondary inoculation sites and 1 will be a tertiary inoculation site. This pattern may be repeated over several sections of a larger system. However, it is likely that significant economies of scale will be produced where accumulative dosing is possible between several sections on a system of 10 megaliters per day flow volume or more.

Using EM "Effective Microorganisms" formulations or similar containing purple non-sulphur producing heterotrophic photosynthetic bacteria, lactobacillus, yeasts, actinomycetes, ray fungi, bacillus, chemoautotrophic organisms, phytoplankton and other synergistic organisms; treatment for odour control and fat removal typically requires an overall inoculation rate of 2.5 ppm inoculum concentrate to the effluent.

For further accumulative treatment to effect partial nutrient removal, removal of remaining aggressive atmospheres, and reduction in BOD, TSS and other indicators over time overall inoculation rate of 25 ppm inoculum to effluent is required. Inoculation at higher rates may be needed to target specific problems in a given system. For example a 1,000,000 L/day effluent flow requires approximately 25 L/day of inoculum concentrate for treatment.

The preferred embodiment uses Em-1 as the inoculum concentrate. This concentrated inoculum may be extended/diluted such that material to be injected is made up in the following manner:

3% Inoculum concentrate,

3% molasses or sugar solution, and

94% Aged water (being chlorinated or otherwise disinfected water left to stand out of sunlight in a closed but vented vessel for a minimum of 3 days)

(e.g. 25 liters of inoculum concentrate equates to 833 liters of extended inoculum).

The extended inoculum is preferably allowed to stand in a sealed and pressure vented container in indirect sunlight for 5 to 7 days or until pH of the dilution reaches 3.5 or lower. Further dilution may occur at a ratio of at least 4 parts water to one part extended inoculum on site at the point of inoculation. The above extended inoculum should be delivered such that 10% is injected in the tertiary phase of system inoculation and the balance is divided evenly between all other sites. (e.g. Tertiary site 83 liters/day plus all other sites 12×62.5 liters per day is 833 L/day for a 1,000,000 l/day effluent stream.)

At all inoculation sites, dosing of extended inoculum should be completed such that inoculum is delivered evenly and regularly over a given period (i.e. 24 hours per day). At primary and secondary inoculation sites this dosing should be done with a pulse action dosing pump with pulse intervals and volumes quantified to deliver the required amounts of material over each 24 hour period. At tertiary inoculation sites this delivery should be by pressurised constant delivery over each 24 hour period.

Where there is a relatively high fat or oil concentration, formulations including a ratio of sugars closer to 3% concentrated inoculum and 10% sugars/molasses more effectively address the problem. The extended inoculum produces a much higher concentration of acetic acid. This same result can be achieved by adding citric acid or acetic acid to the inoculum prior to dilution with carrier water.

The spray nozzle sprays directly at the surface of the incoming effluent and over the point of turbulence. It is preferred to encourage the inoculum to mix with effluent at this point. The dosing spray should not reach either walls of the chamber or other equipment in the well. Spray droplets should pass directly to the surface of the effluent.

Low dose, multipoint, regular inoculation can be applied to any system. This includes partially closed loop systems and on-site systems. In these instances, early dosing points are selected (as early as the first waste trap or grease trap or the toilet cistern(s) or bowl(s)) and a recirculation loop is installed in the on-site plant to encourage re-inoculation or accumulation (booster) dosing. A secondary inoculation point is installed in an incubation chamber closer to the plant (normally a transfer station or pump well). Again, fermentation in an anaerobic state is conducted first followed by chambers for aerobic activity. In this case fermentation will normally be conducted in installed fermentation tanks or chambers (generally above ground) and aeration will be in similar tanks with air driven clarification. Bio-filtration (inoculation chambers) and return of potable water from end of system may be used in the seeding process.

The present invention concerns a system wide inoculation method (as opposed point inoculation) and addresses all the effluent in a system several times over a period (as effluent proceeds through the system). Calculation of appropriate inoculation rates are made given the time waste water spends in the system, ie residence time and any extension of it by up-line retention points.

A variation of the method splits the functions at the treatment plant and provides for installation of large chambers designed to perform both fermentation and aeration functions up line in a collection system. That is, installing tanks and equipment to collect from each 50 to 70 households or equivalent in a system and having only tertiary treatment processes down line.

In in-line inoculation chambers the cylindrical shape of the ceramic pieces, threaded onto a flexible rod allows a rippling motion of the effluent as it passes through the inoculation chamber. This motion approximates the motion of a creek over a gravel bed and does encourage transfer between the anaerobic holding areas below the sheet of ceramics in the inoculation chamber. Also encourages some aerobic activity in and on the ceramics themselves. The rippling motion also serves to keep a partial self-cleaning process going in the inoculation chamber.

Substantially the same principals of early, accumulative, consistent inoculation can be applied to an on-site, recirculating effluent treatment system. For example, in an aquaculture environment, these principals may be employed to bring about substantially total recirculation of water. This requires:

a Primary inoculation at the point of entry of top-up water to Growing/Holding Tanks.
 b Installation of inoculated in-line biological filter(s) at or near the point of water draw-off from holding/growing tanks.
 c Installation of anaerobic retention point with inoculation prior to water return line to holding/growing tanks.
 d Consistent Inoculation system wide to approximate to 10 ppm to the body of water held.
 e Retention of any floculant/sludge captured in the anaerobic tanks—even between crops.

Similarly, in an on-site sewerage treatment system, early inoculation at or near the first collection point for effluent (even as early as the toilet bowl or waste trap), installation of a macerating pit with inoculation before anaerobic fermentation tank(s), installation of an inoculated in-line biological filtration point after aerated processes and recirculation of approximately 10% of flow from the biological filter to the initial macerating sump. In this instance consistent inoculation rates may be initially as high as for flow-through waste collection systems (i.e. 25 ppm) but will generally decline over a period of 6 to 12 months until they reach an equilibrium level of approximately 2.5 ppm to effluent flow.

The use of the method described above may provide the following advantages:

1 Odour Control: Reduction in odour has been recorded throughout the system with the use of the aforementioned method.

2 Fat Consumption: A noticeable result of consistent inoculation is consumption of fats in wells and residence points throughout the system downstream of inoculation points. Fats do not build up as normal in downstream wells. Where fat build-up has been a problem in a system, maintenance becomes significantly simplified in that any remaining material on well walls can be easily hosed off. Build-ups do not extend in caked structures off the walls and do not require manual scraping or chipping to remove. Similarly, there are no large fat loads downstream after cleaning and no re-constitution of fats later in the system. Typically, measurable reductions in water borne fat content are observable after approximately ninety days of consistent inoculation.

3 Foaming Control: As a consequence of the above, lower fat content in the sewerage Treatment Plant results in lower populations of filamentous bacteria and consequently, significant reductions in foaming at the treatment plant.

4 Noxious and aggressive atmosphere control: Upon establishment of a consistent and accumulative inoculation program, noxious and aggressive atmospheres are significantly reduced throughout a collection and transfer system. This is particularly important for maintenance and complaint management issues as well as workplace health and safety issues.

5 Oxygen bonus in long rising mains: Traditionally, long rising mains have been a source of some concern for collection and transfer systems in that anaerobic activity and putrefaction in-line in such mains can lead to production of large amounts of hydrogen sulphide and other gases. In many instances, the injection of oxygen to such lines has been employed as a chemical countermeasure to address this issue. An early inoculation program and the development of a persistent culture of low temperature fermentation organisms—particularly including non-sulphur producing, heterotrophic photosynthetic bacteria—throughout a given system results in a balance of micro-organic activity occurring which allows the presence of dissolved oxygen to be equivalent to or higher than that obtained by normal levels of oxygen injection. This suggests that where a full program of early inoculation is adopted (including primary, secondary and tertiary level inoculation as described here), oxygen injection costs can be reduced.

6 Up-Line Nutrient Removal: An accumulative reduction in nutrient (N&P) levels in waste water is achieved where a consistent inoculation program is continued over a 12 to 18 month period. As beneficial cultures develop, the rate of reduction of N & P in effluent to Sewerage Treatment Plant increases to a plateau level of 50% removal. It is noticeable, however, that given a tertiary phase treatment in Plant, rapid nutrient removal occurs where seeded cultures of microorganisms are already present in effluent from the Treatment Plant.

7 BOD (biochemical oxygen demand) reduction up-line: A trend of BOD reduction occurs gradually over a period of time as beneficial cultures are established.

8 TSS (total suspended solids) Reduction up-line: A trend of TSS reduction occurs gradually over a period of time as beneficial cultures are established.

9 Pathogen Control: This feature is of particular importance as a means of diversifying the risks involved in sewerage spills, overflows and the like. It appears as if competitive activity among beneficial microorganisms in the inoculum results in far less proliferation of pathogens than would otherwise be expected in effluent and in a much more rapid decline in such pathogenic populations given discharge to the environment than would otherwise be expected. This is particularly true where discharge occurs in an area where effluent containing "EM" formulations as the inoculum is exposed to sunlight.

It will of course be realised that while the foregoing has been given by way of illustrative example of this invention, all such and other modifications and variations thereto as would be apparent to persons skilled in the art are deemed to fall within the broad scope and ambit of this invention as is herein set forth.

What is claimed is:

1. A method of treating waste water passed through a conduit system comprising at least one conduit extending from at least one entry point to a discharge point and including at least one quiescent zone where water is at least temporarily slowed in its displacement towards the discharge point, the method including introducing an inoculum into the system at at least one primary inoculation site for facilitating its entry into the quiescent zone where it incubates and forms an inoculum culture that influences the type and quantity of certain microorganism populations in the system both within the quiescent zone and downstream thereof, the inoculum culture encouraging micro-organisms that assist with the break down or degradation of organic compounds within the system and retarding micro-organisms that tend to form undesirable compounds from the organic compounds in the system.

2. A method according to claim 1, wherein the culture incubated by the inoculum typically comprises both aerobic and anaerobic micro-organisms.

3. A method according to claim 2, wherein the micro-organisms in the inoculum culture exist in a symbiotic relationship with each other so that when the micro-organisms in the inoculum culture are carried by the water into an anaerobic environment a viable population of aerobic organisms will remain and when the micro-organisms incubated by the inoculum culture are carried in the water into an aerobic environment a viable population of anaerobic micro-organisms will remain.

4. A method according to claim 1, wherein the system includes at least one surface and the micro-organisms formed by the inoculum adhere tenaciously to the surface/s of the system.

5. A method according to claim 4, wherein the conduit system defines a plurality of surfaces in the quiescent zone, and wherein the microorganisms resulting from the inoculum have the ability to adhere at least as tenaciously to the surface/s as micro-organisms that occur naturally in the system and tend to form undesirable compounds in the system.

6. A method according to claim 5, wherein the conduit/s in the conduit system include pumping wells, rising mains, or gravity mains and the quiescent zone/s are formed in the pumping wells, rising mains or gravity mains.

7. A method according to claim 1, wherein the inoculum is introduced into the quiescent zone either directly or indirectly and wherein the inoculum is dosed into the system evenly over a unit time period.

8. A method according to claim 7, wherein the inoculum is introduced indirectly into the quiescent zone by introducing the inoculum into the conduit/s either upstream or downstream of the quiescent zone and allowing either gas or liquid fluid flow in the system to carry the inoculum to the quiescent zone.

9. A method according to claim 8, wherein the inoculum is introduced indirectly into the quiescent zone by being introduced into the water upstream of the quiescent zone and then being allowed to flow with the water to the quiescent zone.

10. A method according to claim 8, wherein the inoculum is introduced into an air space within the conduit as fine droplets either upstream or downstream of the quiescent zone, and is carried by the air to the quiescent zone.

11. A method according to claim 1, wherein the inoculum includes photosynthetic micro-organisms, heterotrophic bacteria, and lactic acid bacteria and also a substrate.

12. A method according to claim 11, wherein the inoculum includes purple non-sulphur producing hetero trophic photosynthetic bacteria, lactobacillus, yeasts, actinomycetes, Nocardia species, ray fungi, plankton and other chemoauto trophic bacteria.

13. A method according to claim 12, wherein the inoculum is produced from the EM (Effective Micro-organisms) formulation.

14. A method according to claim 1, wherein the conduit system has a plurality of conduits in parallel, and wherein the method includes introducing inoculum into conduits in parallel with each other at a plurality of primary inoculation sites, each inoculation site facilitating entry of the inoculum into an associated quiescent zone.

15. A method according to claim 1, wherein each primary inoculation site is positioned such that at least 50% of the water passing through the inoculation site has spent less than 25% of its total residence time in the system when it passes through the inoculation site.

16. A method according to claim 1, wherein the conduit system includes at least one secondary inoculation site positioned downstream of the primary inoculation site/s, each secondary inoculation site introducing inoculum to a yet further quiescent zone and positioned such that at least 50% of the water passing through the site has spent 50 to 75% of its residence time in the system.

17. A method according to claim 16, wherein the system also includes at least one further inoculation site called a tertiary inoculation site downstream of the secondary inoculation site and wherein substantially all of the water flows through the tertiary inoculation site.

18. A method according to claim 17, wherein the dosage rate of inoculum at each of the inoculation sites is substantially the same and the inoculum is delivered regularly and evenly over a unit time period.

19. A method according to claim 18, wherein the system has only one tertiary inoculation site and the site is positioned such that the water passing through the site has spent 50 to 80% of its residence time in the conduit system.

20. A method according to claim 19, wherein the tertiary inoculation site is positioned so that the inoculum introduced at the site is incubated in a quiescent zone which is a pumping well prior to a rising main.

21. A method according to claim 1, wherein the amount of inoculum introduced into the conduit system per unit time is a function of the surface area of the interior surface of the conduit system and the residence time of water in the system and also the volumetric flowrate of water flowing through the system.

22. A method according to claim 21, wherein at least 70% of the primary inoculation sites have a difference in dosage rates of inoculum of less than 20%.

23. A method according to claim 22, wherein at least 70% of the primary inoculation sites have a difference in dosage rates of inoculum of less than 5%.

24. A method according to claim 23, wherein the dosage rate of inoculum across at least 70% of the primary inoculation sites is approximately the same.

25. A method according to claim 21, further including at least two secondary inoculation sites positioned downstream of the primary inoculation site/s, and wherein the difference between dosage rates of inoculum at more than half of the secondary inoculation sites is less than 20%.

26. A method according to claim 25, wherein the difference between dosage rates of inoculum at more than half of the secondary inoculation sites is less than 5%.

27. A method according to claim 26, wherein the dosage rate of inoculum at more than half of the secondary inoculation sites is approximately the same.

28. A method according to claim 25, further including at least one tertiary inoculation site and wherein the dosage rate of inoculum at the tertiary site is at least four times the average dosage rate at the primary inoculation sites.

29. A method according to claim 28, wherein each of the primary inoculation sites and more than half of the secondary inoculation sites have a difference in dosage rates of not more than 10%.

30. A method of treating waste water passed through a conduit system comprising at least one conduit extending from at least one entry point to a discharge point the method including introducing an inoculum into the system at at least two inoculation sites longitudinally spaced apart from each other along the conduit system, the sites being used to introduce inoculum to the conduit system where it incubates and forms an inoculum culture that influences the type and quantity of certain micro-organism populations in the system both proximate to the inoculation site and downstream thereof, the inoculum culture encouraging micro-organisms that assist with the break down or degradation of organic compounds within the system and retarding micro-organisms that tend to form undesirable compounds from the organic compounds in the system.

31. A method according to claim 30, wherein the sites are positioned such that the substrates or populations of micro-organisms fostered by the inoculum culture does not vary by more than 20% downstream of the first inoculation site.

32. A method according to claim 30, wherein the population of micro-organisms incubated within the conduit system are relatively stable and the substrates or populations of micro-organisms established at a said site would not vary dramatically, that is by more than 20% between the inoculation site and a point downstream of the site.

33. A method according to claim 30, wherein the dosage rate of inoculum at each of the inoculation sites is substantially the same and the inoculum is delivered regularly and evenly over a unit time period.

34. A method according to claim 33, wherein at each site small doses of inoculum are introduced into the system continuously and without interruption and with a regularly repeating dosing profile that involves releasing small quantities of inoculum at short and regular time intervals.

35. A method according to claim 31, having two or three said inoculation sites longitudinally spaced apart from each other.

* * * * *